April 16, 1929. W. O'NEILL 1,709,319

SAFETY DEVICE FOR PASSENGER VEHICLES

Filed Nov. 28, 1927

Inventor:
William O'Neill

Patented Apr. 16, 1929.

1,709,319

UNITED STATES PATENT OFFICE.

WILLIAM O'NEILL, OF MILWAUKEE, WISCONSIN.

SAFETY DEVICE FOR PASSENGER VEHICLES.

Application filed November 28, 1927. Serial No. 236,339.

My invention relates to improvements in the safety devices used in connection with pneumatically operated doors and pneumatically operated brakes on vehicles; and the objects of my improvements are, first, to prevent the vehicle from being moved when the passenger is using the door or step to alight from or board the vehicle; second, to prevent the operator from closing the door or step when a passenger is using same for alighting or boarding purposes; third, to provide a means whereby the operator can tell by the operation of the handle to the valve controlling the doors, steps, and brakes whether the door or step is being used by a passenger.

Figure 1:
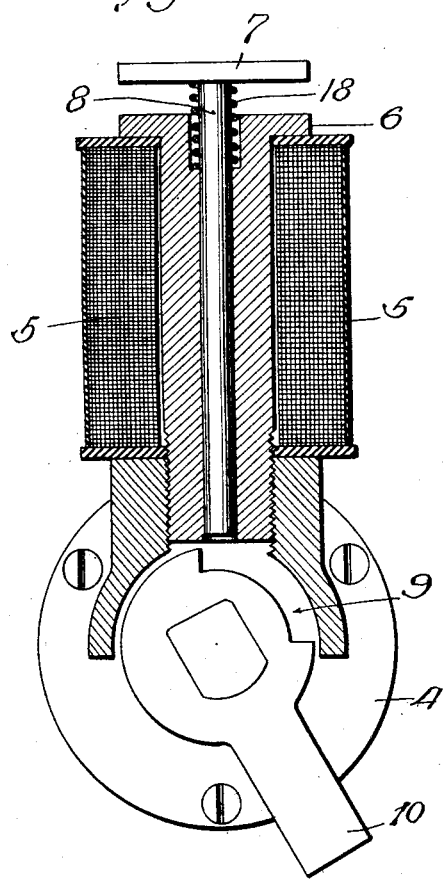
Figure 3:
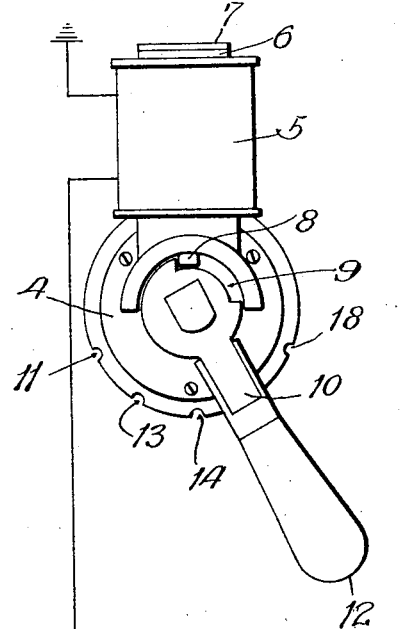
Figure 2:
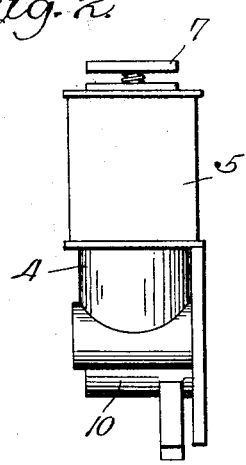
Figure 2:
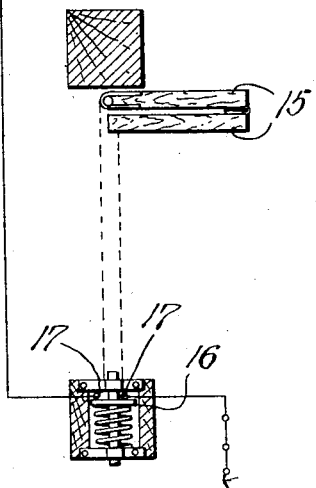

I attain these objects by the mechanism illustrated in the accompanying drawing in which Figure 1 is a cross section of the entire device. Figure 2 is a side elevation of the entire device. This is shown in a smaller scale to save space. Figure 3 is a schematic layout of the device and the electrical circuits used in connection with it.

Similar numerals refer to similar parts throughout the several views.

The plate or bracket, 4, is used for securing the device to a valve controlling the operation of the pneumatically operated doors and steps and pneumatically operated brakes. The magnet windings, 5, are secured to the bracket, 4, by the pole piece, 6. The armature, 7, when attracted by the energized magnet, 5, will push the shaft, 8, through a hole prepared for it in the pole piece, 6, into a notch, 9, in the valve operating handle, 10.

The function of the device may best be understood when the action of the pneumatic brake and door system is described.

Figure 3, shows the combination brake and door control handle, 10, in the door open position. In passing from the release position, 11, to the door opening position, 12, the handle must necessarily pass through the brakes applied position, 13, and the door closed position, 14, therefore the brakes are always applied when the handle is at the door opening position, 12. When the handle is in this position, 12, the air lines to the door engine are charged with compressed air and if a passenger opens the valve to the door engine the door, 15, will open. When the door, 15, opens it allows the shunt, 16, to shunt the contacts, 17, 17, thereby establishing a complete circuit and energizing magnet, 5, which causes the bolt, 8, to travel into the notch, 9, thereby preventing the handle from being moved back to the door closed, 14, or the brakes released position 11. The handle may, however, be advanced to the emergency position, 18.

After the passenger has passed through the door and has left the step, the door automatically closes, as shown with broken lines, and pushes the shunt, 16, away from the contacts, 17, 17 thereby de-energizing the magnet, 5. Spring, 18, (Fig. 1) will then cause the bolt, 8, to be pulled back and normal operation of the air control handle can again be resumed.

I claim:

1. A device for locking the valve handle controlling the passage of air to the brake system and the door operating mechanism in a position that will prevent the operator from releasing the compressed air from the doors and brakes and prevent the operator from applying compressed air to the door closing mechanism when the door is partially or fully open, but will allow the operator to move the air valve handle to the emergency position, substantially as described.

2. A device for use on passenger vehicles having a pneumatic door operating mechanism and pneumatic brakes, said device comprising a manually operable valve controlling the brake system and door mechanism, automatic locking mechanism for preventing motion of the valve from brake applying position and door opening position to brake releasing and door closing position, and means operatively connected to the door for controlling the operation of said locking mechanism.

3. A device for use on passenger vehicles having a pneumatic door operating mechanism and pneumatic brakes, said device comprising a manually operable valve controlling the brake system and door mechanism, and adapted to occupy a brake releasing position, a brake applying and door operating position and an emergency position, automatic electromagnetic mechanism for locking said valve against movement to brake releasing position and door closing position and permitting motion of said valve to emergency position, and means controlled by the door for controlling said locking mechanism.

WILLIAM O'NEILL.